S. G. RANDALL.
Making Springs.

No. 57,377.

Patented Aug. 21, 1866.

Inventor:
Silas G. Randall.

UNITED STATES PATENT OFFICE.

SILAS G. RANDALL, OF PROVIDENCE, RHODE ISLAND.

IMPROVEMENT IN THE MANUFACTURE OF ELASTIC SPRINGS.

Specification forming part of Letters Patent No. 57,377, dated August 21, 1866; antedated August 8, 1866.

*To all whom it may concern:*

Be it known that I, SILAS G. RANDALL, of the city of Providence and State of Rhode Island, have invented a new and improved mode of holding compressed air or steam for securing spring or reciprocating action; and I do hereby declare that the following is a full and exact description thereof.

The nature of my invention consists in the use of tubing made of flexible material, such as leather or rubber hose, brought into an elliptic form, as a case for holding compressed air or steam, by closing the ends of the tube and placing it between two surfaces, metallic or otherwise, where resistance and spring or reciprocating action is sought.

Figure 2:
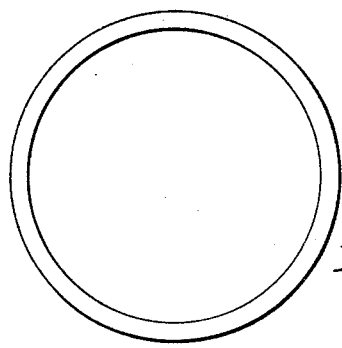
Figure 3:
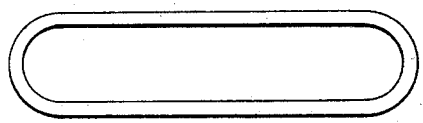
Figure 4:
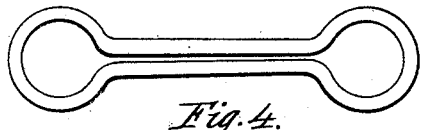
Figure 1:
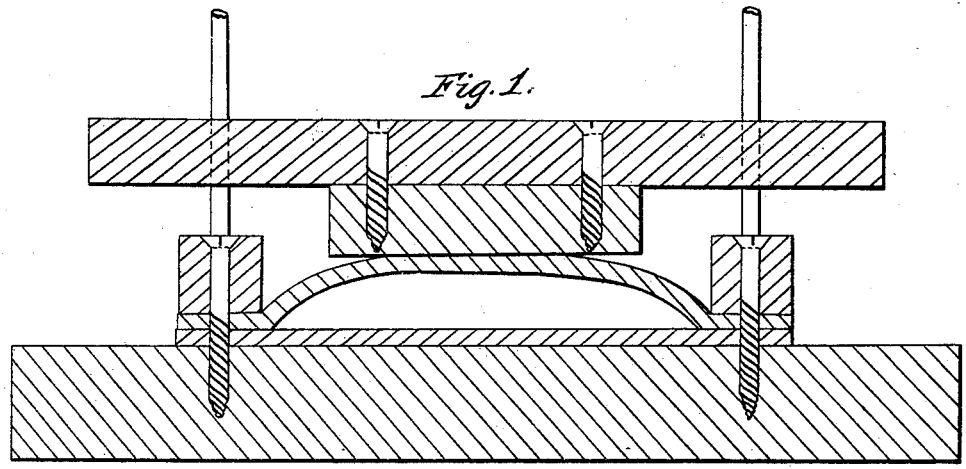

The drawings hereunto annexed exhibit three forms. Figure 1 shows, in longitudinal section, the tube and plates in position; Fig. 2, a sectional end of the tube; Fig. 3, the elliptic form for power and action. Fig. 4 shows the flat inner surfaces of the tube met.

The best form for power and action is when the tube is so far flattened that the distance between its inner surfaces is about one-fourth of the diameter of the tube in its normal state, though any such material change from the sectional circle involves the principle contemplated. The ends of the tube when in this elliptic form are made air or steam tight, unless communicating with a reservoir, whereby a softer spring action is obtained having equal supporting power, or with passages for the ingress and egress of steam or compressed air for effecting reciprocating motion.

A section of such tubing brought into the elliptic form, thus securing elliptic action when the plates pressing upon it recede from or approach each other, the tube with the ends closed, as above indicated, being filled with compressed air or steam, may be used as an air-spring for cars or other vehicles, as a bumper for cars, and as a brake-power acting on the hydrostatic law. Two of such tubular sections operated by suitable mechanism might be used in place of cylinder and piston for obtaining reciprocating motion.

I do not wish to confine myself to any specific use to which the tube in this form and acting in this manner might be applied.

The advantages of this use of the tube are, its exceeding cheapness, tightness, and the beautiful elliptic action, whereby elasticity is not needed. The diaphragm action demands elasticity for its vibration, thus requiring very thick pure rubber plate; but this elliptic form requires no elasticity, and hence the strongest material made of rubber and cloth may be used. This is a great saving in cost and a great gain in durability, as there is no action in the body of the fabric except in the elliptic lines, and even then it is extremely slight, requiring only flexibility; and these lines may be relieved and new ones obtained by turning the tube one degree farther round and putting it in its place again.

What I claim as my invention, and wish to secure by Letters Patent, is—

The use of flexible tubing brought into the form and acting in the manner herein described, and for the purposes set forth.

SILAS G. RANDALL.

Witnesses:
 JENKINS JONES,
 J. A. DOOLITTLE.